US011381616B2

(12) United States Patent
Hernandez

(10) Patent No.: US 11,381,616 B2
(45) Date of Patent: Jul. 5, 2022

(54) MULTIMEDIA MANAGEMENT SYSTEM AND METHOD OF DISPLAYING REMOTELY HOSTED CONTENT

(71) Applicant: Brian Hernandez, Scottsdale, AZ (US)

(72) Inventor: Brian Hernandez, Scottsdale, AZ (US)

( * ) Notice: Subject to any disclaimer, the term of this patent is extended or adjusted under 35 U.S.C. 154(b) by 0 days.

(21) Appl. No.: 16/742,867

(22) Filed: Jan. 14, 2020

(65) Prior Publication Data
US 2020/0153884 A1 May 14, 2020

Related U.S. Application Data

(63) Continuation-in-part of application No. 13/862,007, filed on Apr. 12, 2013, now abandoned.

(51) Int. Cl.
*H04L 65/612* (2022.01)
*H04L 65/1101* (2022.01)
*H04L 65/60* (2022.01)

(52) U.S. Cl.
CPC .... *H04L 65/4084* (2013.01); *H04L 29/06027* (2013.01); *H04L 65/601* (2013.01)

(58) Field of Classification Search
None
See application file for complete search history.

(56) References Cited

U.S. PATENT DOCUMENTS

| 10,958,958 B2* | 3/2021 | Hardee | H04L 65/60 |
| 2005/0149970 A1* | 7/2005 | Fairhurst | G06F 3/0482 725/47 |
| 2006/0288123 A1* | 12/2006 | Vered | H04L 65/605 709/246 |
| 2008/0016185 A1* | 1/2008 | Herberger | H04L 65/4092 709/219 |
| 2008/0028294 A1* | 1/2008 | Sell | G06F 16/58 715/234 |
| 2010/0205279 A1* | 8/2010 | Takakura | H04L 67/2857 709/219 |
| 2011/0037864 A1* | 2/2011 | Cao | H04N 5/23206 348/211.3 |
| 2012/0185922 A1* | 7/2012 | Kamity | H04N 21/234309 726/4 |
| 2017/0006314 A1* | 1/2017 | Danovitz | H04L 65/00 |
| 2017/0019446 A1* | 1/2017 | Son | H04L 65/1063 |
| 2017/0142494 A1* | 5/2017 | Jiang | H04N 21/2743 |

* cited by examiner

*Primary Examiner* — Frank D Mills
(74) *Attorney, Agent, or Firm* — Rodney J. Fuller; Booth Udall Fuller, PLC

(57) ABSTRACT

A multimedia management system includes a multimedia device and a backend server. The multimedia device includes a memory programmed with a mobile application, a processor module, a wireless communication module configured to communicate over a wireless communication link, and a first multimedia device configured to capture a first video or image and a second video or image and store it as first multimedia content and second multimedia content. The mobile application is configured to transmit the first and second multimedia content over the wireless communication link via the wireless communication module. The backend server is communicably coupled to the multimedia device via the wireless communications link and configured to execute a persistent internet accessible request protocol for receiving, updating, and storing transmitted videos. The multimedia management system is useful for hosting and remotely managing multimedia content.

20 Claims, 3 Drawing Sheets

MULTIMEDIA MANAGEMENT SYSTEM AND METHOD OF DISPLAYING REMOTELY HOSTED CONTENT

CROSS-REFERENCE TO RELATED APPLICATION(S)

The present application is a Continuation-in-Part and is related to and claims priority to pending U.S. patent application Ser. No. 13/862,007 filed Apr. 12, 2013, which is incorporated by reference herein in its entirety.

BACKGROUND

The following includes information that may be useful in understanding the present disclosure. It is not an admission that any of the information provided herein is prior art nor material to the presently described or claimed invention, nor that any publication or document that is specifically or implicitly referenced is prior art.

TECHNICAL FIELD

The present disclosure relates generally to the field of computer programming of existing art and more specifically relates to multimedia hosting services.

RELATED ART

Many individuals use the internet to access information and for communication. An internet hosting service is a service that runs internet servers, allowing organizations and individuals to serve content to the internet. There are various levels of service and various kinds of services offered. A common kind of hosting is web hosting. Most hosting providers offer a combination of services; e-mail hosting, for example. DNS hosting service is usually bundled with domain name registration. Generic kinds of internet hosting provide a server where the clients can run anything they want (including web servers and other servers) and have internet connections with good upstream bandwidth. Internet providers may provide capability for video hosting. Managing of multimedia content may be difficult with present solutions.

SUMMARY OF THE DISCLOSURE

In view of the foregoing disadvantages inherent in the known computer programming art, the present disclosure provides a multimedia management system and method. The general purpose of the present disclosure, which will be described subsequently in greater detail, is to provide a system including a multimedia device, mobile application, multimedia device, and backend server that is useful for hosting and remotely managing multimedia content.

Many people use the internet as previously mentioned. Internet providers may provide capability for video hosting. It is desirable to provide an internet accessible website providing a computer script that when incorporated into a webpage retrieves and displays a subscriber's remotely hosted video clip/digital image which can be selectively updated with a new video clip/digital image without changing the provided computer script.

It is further desirable for the internet accessible website to provide the subscriber with a downloadable mobile app whereby the subscriber can download the mobile app to a user provided mobile device enabling the subscriber using the mobile device to upload a video clip/digital image from the mobile device to their remotely hosted video clip/digital image account supplanting any previously loaded digital data thereby providing internet businesses with means for daily dynamic webpage imaging, such as restaurants: specials, breakfast, lunch, and dinner video/image data.

A multimedia management system is disclosed herein. The multimedia management system includes a multimedia device and a backend server. The multimedia device may include communicably coupled together a memory programmed with a computer application, a processor module configured to execute said computer application, a wireless communication module configured to communicate over a wireless communication link, and a media capture device configured to capture a first video and a second video, the mobile application configured to transmit the first video and the second video over the wireless communication link via the wireless communication module.

The backend server may be communicably coupled to the multimedia device via the wireless communications link and further configured to execute a persistent internet accessible request protocol, said persistent internet accessible request protocol configured to communicate a stored video to a remote media device over an internet connection and in response to a video/image request. The backend server may also be configured to receive the first video and to store the first video as the stored video. Further still, the backend server may additionally be configured to receive the second video, to store the second video as the stored video, replacing the first video with the second video.

According to an embodiment, a method of providing video/image content across a plurality of platforms is also disclosed herein. The method of providing video/image content across a plurality of platforms includes inserting a call into a remote media device, the call configured to initiate a video/image request to a persistent internet accessible request protocol executable on a backend server; communicating the first video/image to the backend server via a wireless communication link; storing the first video/image in the backend server as a stored video/image content; making the video/image request for the stored video/image content to the backend server by selecting the call inserted in the remote media device; receiving and playing the first video/image as the stored video/image content, by the remote media device; capturing a second video/image, and communicating the second video/image to the backend server; storing the second video/image in the backend server as the stored video/image content, replacing the first video/image; making the video/image request for the stored video/image to the backend server by selecting the call inserted in the remote media device; and receiving and playing the second video/image, by the remote media device in response to the video/image request.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosed systems and methods may be embodied or carried out in a manner that achieves or optimizes one advantage or group of advantages as taught herein without necessarily achieving other advantages as may be taught or suggested herein.

BRIEF DESCRIPTION OF THE DRAWINGS

The figures which accompany the written portion of this specification illustrate embodiments and methods of use for the present disclosure, a multimedia management system, constructed and operative according to the teachings of the present disclosure.

The various embodiments of the disclosed systems and methods will hereinafter be described in conjunction with the appended drawings, wherein like designations denote like elements.

DETAILED DESCRIPTION

Figure 1:
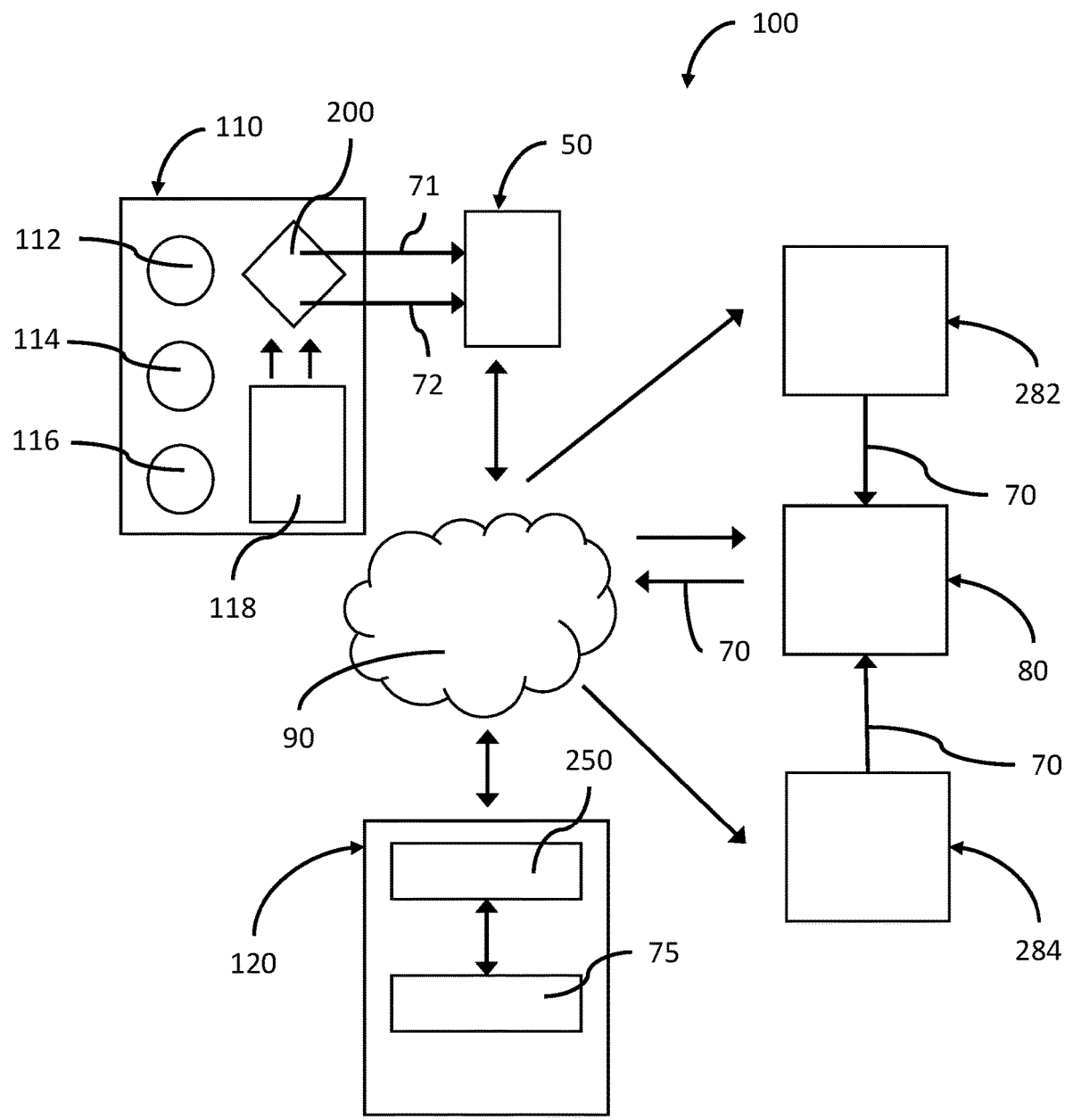
FIG. 1 is a schematic diagram of the multimedia management system showing the interaction of components included in the system, according to some embodiments of the disclosure.

As discussed above, embodiments of the present disclosure relate to computer programming and more particularly to a multimedia management system as used to improve the hosting, distribution and remote management of multimedia content.

Generally, the disclosed system and methods may be used to allow websites incorporating video clips or digital images by using a dynamic method of displaying new website content through hosting of image content data, performed only once incorporating into a subscriber's website the resource locator code for the subscriber's hosted image content data, downloading an image content data app to a subscriber provided mobile device with the app forming subscriber graphical user interface (GUI) for managing and editing their image content data whenever desired with the new image content data file overlaying the old therein enabling the website with dynamic imaging that doesn't require website change to effect display of subscriber's new image content data.

The disclosed systems and methods may be used to provide hosting for subscriber image content data having image content data storage with a resource identifier code that is incorporated only once into a portion of a website of the subscriber enabling remote access to subscriber's hosted image content data.

An object of some embodiments of the disclosed methods and systems is to provide hosting for subscriber image content data storage and downloadable app providing subscriber (GUI) for accessing and modifying their hosted image content data storage with new content using their mobile device.

An object of some embodiments of the disclosed methods and systems is to provide a method for generating dynamic imaging for a portion of a user's website whereby the internet accessible hosting website further provides subscriber account access through passcode and GUI for subscriber data management.

An object of some embodiments of the disclosed methods and systems is to provide hosting for a method for generating dynamic imaging for a portion of a user's website wherein the internet accessible hosting website provides an electronic transmission to a subscriber of the subscriber's resource locator code that is to be added into the subscriber's website for all future remote retrieval of the subscriber's image content data from the subscriber's image content data storage.

An object of some embodiments of the disclosed methods and systems is to provide a method for generating dynamic imaging for a portion of a user's website where the image content data is user provided that can be overlaid with new subscriber content through the mobile device app GUI as desired by the subscriber.

An object of some embodiments of the disclosed methods and systems is to provide a method for generating dynamic imaging for a portion of a user's website wherein the image content data is a digital image, photo, video clip, or similar content.

An object of some embodiments of the disclosed methods and systems is to provide a method for generating dynamic imaging for a portion of a user's website wherein said user provided mobile device is a camera, smartphone, cell phone, computer, portable computer, tablet computer or similar devices enabled both with a camera and an internet connection.

An object of some embodiments of the disclosed methods and systems is to provide a method for generating dynamic imaging for a portion of a user's website, the method may include providing an image content data storage having a plurality of image content data files where then downloading and installing the hosting provider's app into a subscriber's provided mobile device provides GUI means for subscriber content data storage management, whereby the subscriber can upload a plurality of image content data files to their hosted image content data storage with GUI means for displaying one or more image data files whenever desired therein enabling the website with dynamic imaging that doesn't require website change to effect display of subscriber new image content data.

An object of some embodiments of the disclosed methods and systems is to provide a method for generating dynamic imaging for a portion of a user's website where the internet accessible hosting website further provides for electronic transmission to a subscriber of the subscriber's resource locator code and optionally a script that is to be embedded into the subscriber's website for all future remote retrieval of the subscriber's image content data from the subscriber's image content data storage for retrieving and displaying a plurality of image control data files.

An object of some embodiments of the disclosed methods and systems is to provide a method for generating dynamic imaging for a portion of a user's website where the image content data is user provided and uploaded to the subscriber's image content library whereby the subscriber can delete, edit and queue one or more image content data files within the subscriber's image content storage library.

Objects of some embodiments of the disclosed methods and systems may appear as the description proceeds. Some embodiments of the disclosed methods and systems overcome the shortcomings of the prior art by providing a system and method of generating dynamic website imaging for users having websites incorporating website hardcoded video clip or digital image links, are provided a dynamic method of displaying new website content through hosting of image content data, performing only once, incorporating into a subscriber's website the resource locator code for the subscriber's hosted image content data, downloading an image content data app to a subscriber provided mobile device with the app forming subscriber GUI for managing and editing their multimedia content data.

Some embodiments of the disclosed methods and systems may be configured to include an application programming interface (API) for integrating and facilitating elements of the multimedia management system with other digital content platforms. Parts of the API may include methods or protocol for seamlessly adapting and distributing select digital content to a plurality of platforms across multiple platforms or directories from a control channel. This control channel may be configured in the multimedia management system as a login and password portal within the system as an element of the mobile application or backend server. This may provide a basis for expanding the scope and functionality of the multimedia management system as digital content platforms and channels continue to evolve.

Some digital content captured for distribution through the multimedia management system may be limited in size. This maximum size may be configured directly through the included backend server as a predetermined timeframe that shared video content is permitted to run. Other embodiments of this system may include upgradable accounts or service packages that allow a user to extend this predetermined timeframe (as regulated by the backend server) in order to share additional digital content (including videos, audio files, images, photos, renderings, and the like) that exceeds the initial predetermined timeframe established through the system.

An object of some embodiments of the disclosed methods and systems may be to provide a system and method for allowing shared digital content to be integrated with or interact with multimedia items not stored on the backend server. Such interactions may occur when video/image requests are made from outside remote media devices that may be directed to other multimedia content related to the shared digital content provided by a user. Yet another example may occur when a user on a differing media or network platform makes a content request that is filtered and integrated with digital content metadata outside of the multimedia management system. This filtered content request may be directed to or combined with supplementary multimedia requests that may be directed to a shared item within the multimedia management system. In one embodiment, a user of the multimedia management system may permit a shared item to integrate with this supplementary multimedia request. An example of this may be when a user is navigating through directories, applications, platforms, or other networks that function to combine multiple users based upon location, preferences, and/or backgrounds.

In one embodiment, the multimedia management system may comprise a multimedia device, the multimedia device including communicably coupled together a memory programmed with a mobile application. The multimedia device may also include a processor module configured to execute said mobile application. In one embodiment, the multimedia device of this system may be configured as a telephony device, which may further include a digital camera.

Further still, the multimedia device may include a wireless communication module configured to communicate over a wireless communication link, and a first multimedia capture device configured to capture a first video and a second video. In addition, the mobile application may be configured to transmit the first video and the second video over the wireless communication link via the wireless communication module.

The multimedia management system may also comprise a backend server communicably coupled to the multimedia device via the wireless communications link. The backend server may be configured to execute a persistent internet accessible request protocol, the persistent internet accessible request protocol configured to communicate a stored video to a remote media device over an internet connection and in response to a video/image request.

The backend server may also be configured to receive the first video, and to store the first video as the stored video. On the backend server, the stored video may be limited to a maximum duration, where the maximum duration may be predefined or configured by the backend server. In addition, the backend server may also be configured to augment or extend the maximum duration by a predefined timeframe. This extension may allow the system to provide additional storage or digital content sharing capabilities for a user as an upgrade option or alternative configuration. Further still, the backend server may be configured to receive the second video, to store the second video as the stored video, replacing the first video with the second video.

The multimedia management system may include receiving images or video content from a second multimedia capture device configured to capture a third video, and further configured to transmit the third video to the backend server. The persistent internet accessible request protocol may further be configured to receive the third video, to store the third video as the stored video, replacing the second video with the third video.

The video/image request of the remote media device may be made via a first social media platform or a second social media platform. The persistent internet accessible request protocol may be further configured to adapt the stored video communicated over the internet connection to the second social media platform. The persistent internet accessible request protocol may also be configured to integrate the stored video with a multimedia item not stored on the backend server. This may allow the system to further expand in scope with growing technology needs, expanding platform functionality, and network developments. The persistent internet accessible request protocol may also include an application programming interface (API) configured to adapt the persistent internet accessible request protocol, wherein the API may be further configured to integrate the stored video on differing network platforms. In some embodiments the backend server receives text data that is associated with a specific video or a specific data and stores the text data as associated with a specific content file. The text data may be a description of the video or image, or text to be associated with the video or image.

In some embodiments the stored video or image content may be delivered as static content, rather than dynamic content, when the backend server receives a call for the content from a social media platform or other platform. This may allow a user to update content on the backend server, and then post the link or persistent internet accessible request protocol to the content on social media with the current content shared and stored on social media. Then if the user updates the content on the backend server, the content on social media will not change, as the content was shared as a static delivery, and not as a dynamic delivery only showing the current stored image or video content. The call to the backend server may be from an embedded persistent internet accessible request protocol where the backend server will deliver the current version of the stored image or video content where the webpage with the persistent internet accessible request protocol calls the backend server every time a viewer views the webpage. The call to the backend server may be a request for the actual content file as a persistent internet accessible request protocol request for the actual current stored image or video content, rather than a persistent internet accessible request protocol that calls the backend server each time a viewer views a webpage.

Figure 2:
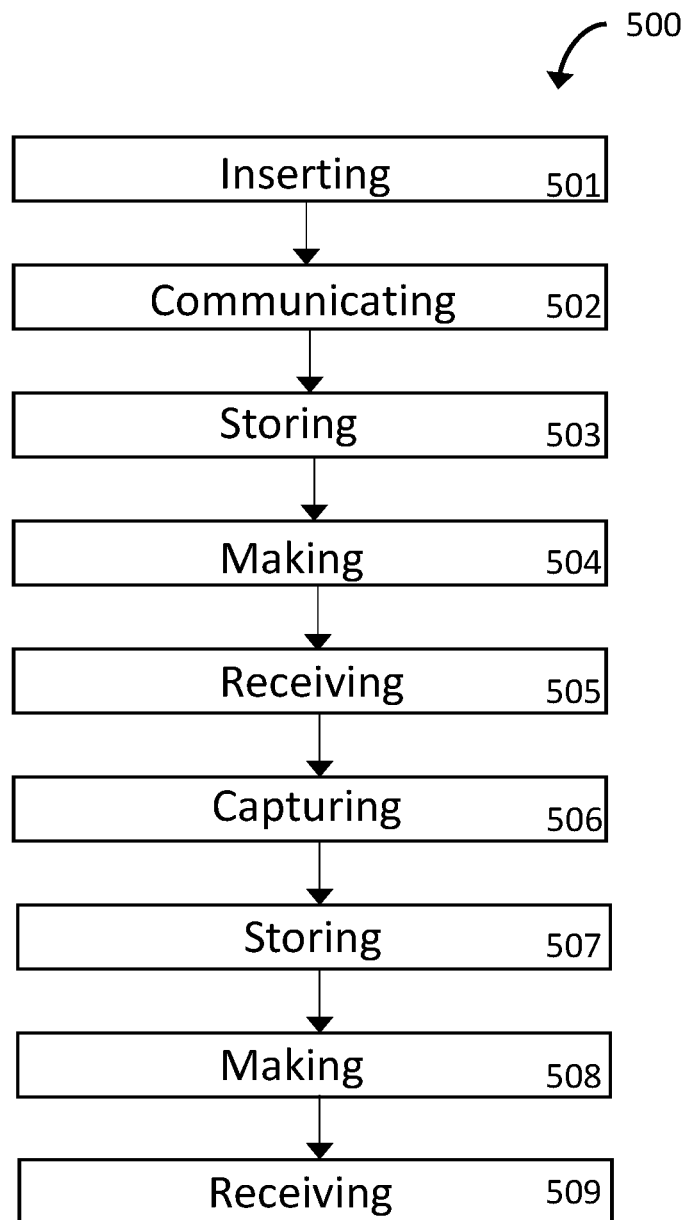
FIG. 2 is a flow diagram illustrating a method of providing video content across a plurality of platforms, according to some embodiments of the present disclosure.
Figure 3:
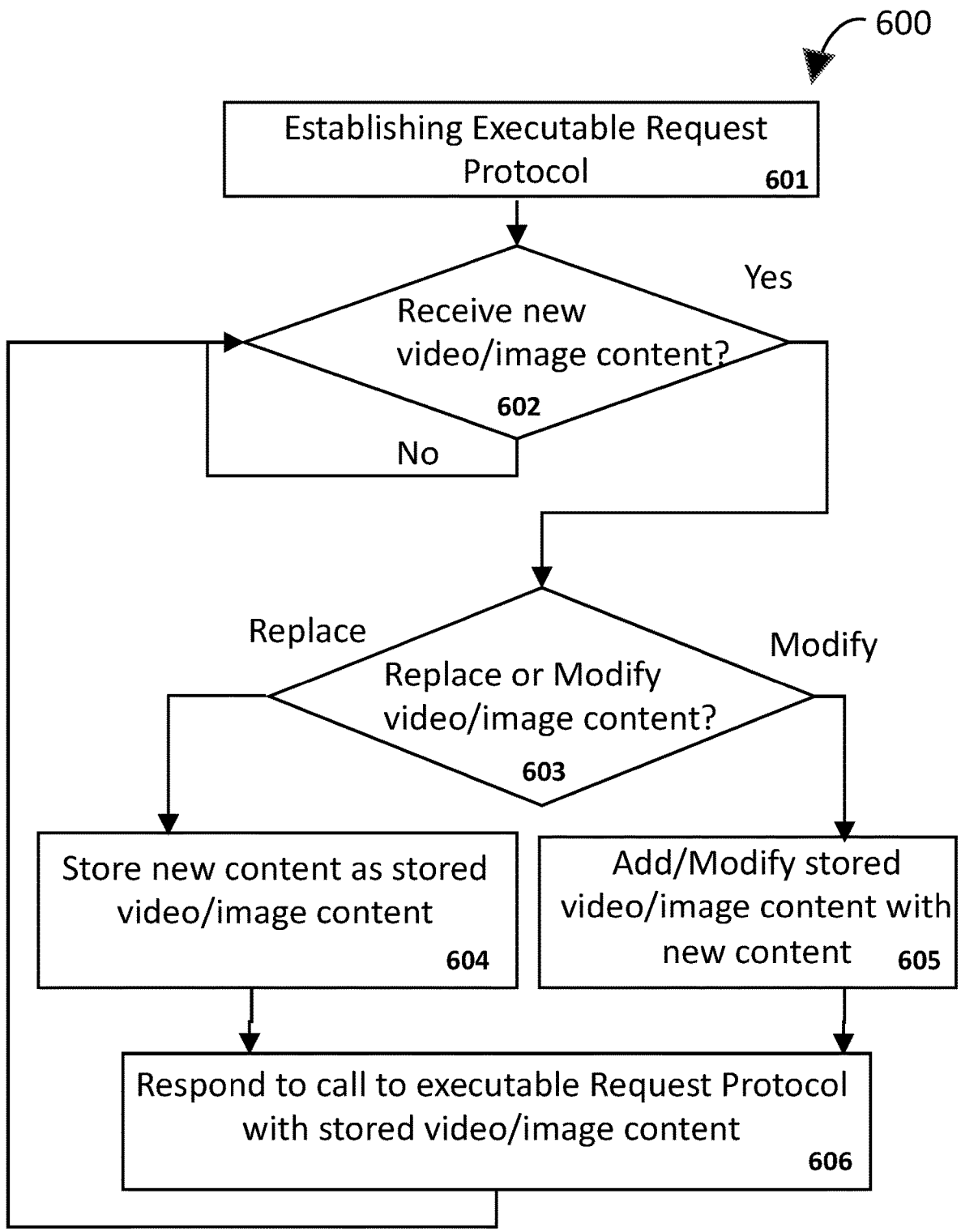
FIG. 3 is a flow diagram illustrating a method of providing video/image content according to some embodiments of the present disclosure.

Referring now more specifically to the drawings by numerals of reference, there is shown in FIGS. 1-3, various views of some embodiments of an internet accessible multimedia management system 100.

FIG. 1 shows an internet accessible multimedia management system 100, according to an embodiment of the present disclosure. Here, the internet accessible multimedia management system 100 may be beneficial for use by a user for hosting and remotely managing multimedia content. As illustrated, the internet accessible multimedia management system 100 may include a multimedia device 110 including communicably coupled together a memory 112 programmed with a computer application 200, a processor module 114 configured to execute the computer application 200, a wireless communication module 116 configured to communicate over a wireless communication link 50, and the multimedia device 110 may include a video/image capture device 118 to capture a first video/image 71 and a second video/image 72. The computer application 200 may be configured to transmit the first video/image 71 and the second video/image 72 over the wireless communication link 50 via the wireless communication module 116. The computer application 200 may be a mobile application (or app) or a desktop application.

The internet accessible multimedia management system 100 may further include a backend server 120 communicably coupled to the multimedia device 110 via the wireless communications link 50, the backend server 120 configured to execute a persistent internet accessible request protocol 250. The persistent internet accessible request protocol 250 may be configured to communicate stored video/image content 75 to a remote media device 80 over an internet connection 90 and in response to a video/image request 70. The backend server 120 may also be configured to receive the first video/image 71, and to store the first video/image 71 as the stored video/image content 75. Further still, the backend server 120 may be configured to receive the second video/image 72 and to store the second video/image 72 as the stored video/image content 75, thereby replacing the first video/image 71 with the second video/image 72.

The video/image request 70 of the internet accessible multimedia management system 100 may be executed by a first social media platform 282 configured to communicating through or in conjunction with a remote media device 80 over an internet connection 90. The video/image request 70 of the internet accessible multimedia management system 100 may also be executed by a second social media platform 284 configured to communicate through or in conjunction with a remote media device 80 over an internet connection 90.

FIG. 2 is a flow diagram illustrating a method of providing 500 video/image content across a plurality of platforms, according to an embodiment of the present disclosure. In particular, the method of providing 500 may include one or more components or features of the internet accessible multimedia management system 100 as described above. As illustrated, the method of providing 500 video/image content across a plurality of platforms may include the steps of: step one 501, inserting a call into a remote media device, the call configured to initiate a video/image request to a persistent internet accessible request protocol executable on a backend server; step two 502, communicating the first video/image to the backend server via a wireless communication link; step three 503, storing the first video/image in the backend server as a stored video/image content; step four 504, making the video/image request for the stored video/image content to the backend server by selecting the call inserted in the remote media device; step five 505, receiving and playing the first video/image as the stored video/image content, by the remote media device; step six 506, capturing a second video/image, and communicating the second video/image to the backend server; step seven 507, storing the second video/image in the backend server as the stored video/image, replacing the first video/image as the stored video/image content; step eight 508, making the video/image request for the stored video/image content to the backend server by selecting the call inserted in the remote media device; and step nine 509, receiving and playing the second video/image as the stored video/image content, by the remote media device in response to the video/image request.

FIG. 3 is a flow chart diagram illustrating a method 600 according to some embodiments. A backend server may establish an executable internet accessible request protocol that responds to a call to the backend server by delivering the stored video/image content (step 601). The call may be used by multiple media servers that are communicatively coupled to the backend server. A call may be from a social media platform. Responding to the call to the backend server from the remote media device may include responding to a single command line from each of the plurality of media servers to deliver the stored video content to the plurality of media servers. The executable internet accessible request protocol may include an application programming interface (API) configured to adapt the executable internet accessible request protocol.

The backend server may determine if a new video/image has been received that is associated with the executable internet accessible request protocol (step 602). If no new video/image has been received the backend server may continue to monitor for new video/image content. If new video/image content is received, the backend server may determine if the stored video/image content will be replaced or modified (step 603). When the executable internet accessible request protocol is established, stored video/image content may be associated with the executable internet accessible request protocol, or no video/image content may be associated with the executable internet accessible request protocol. If there is no video/image content associated with the executable internet accessible request protocol, then the backend server may store the new video/image as the stored video/image content when a first video/image is received. If there is existing video/image content, then the backend server may replace the stored video/image content and store the new video/image content as the stored video/image content (step 604). A user may establish a setting for all new video/image content to replace old video/image content.

An example application of step 604 is a restaurant that may change a menu seasonally or daily based on available items. The restaurant may upload a new image or video from a multimedia device, such as a desktop computer, a tablet, laptop or mobile device. The new image or video may show the current menu. The backend server may automatically replace the new image or video showing the current menu with the previous stored video/image content. In the example of the restaurant, the uploaded image or video of the menu will be displayed on the website of the restaurant, or on a social media profile, or other location where the internet accessible request protocol associated with the user profile is used on a website. If the restaurant owner has multiple websites and multiple social media profiles that all use the same internet accessible request protocol, then all of these will be updated by one update to the backend server with a new video or image uploaded.

The backend server may modify the stored video/image content with the new video/image content (step 605). The modification may include adding the new video/image content to the stored video/image content. The backend server may deliver multiple videos or images in many different formats. For example, the backend server may deliver multiple images in a slider motion format, where a first image is shown and then slides to one side of the screen while a new image slides into the position of the first position. The backend server may modify the stored video/image content by replacing one of multiple videos or images in a group of videos or images delivered as the stored video/image content.

As an example, application of step 605, a website owner may produce new video or image content on a regular basis, such as daily, weekly or monthly. The website owner may establish a setting associated with the executable internet accessible request protocol where a specific number of images or videos will be shown on a page of the owners website in a looping fashion so that when the last video/image in the list is shown, the first video or image in the list is shown next and continues in a continuous loop. In some embodiments the loop may not have a set number other than the total number of videos or images stored as the stored content. The backend server may change the stored video or image content by replacing the video or image that is shown first, and then show all previous videos or images in a loop. The website owner may upload new image/video content and the backend server may replace the oldest video/image with the new video/image content. In this example the website owner may save time and effort by uploading a single video or image and will have the latest content displayed on the website without time consuming or expensive modifications of a website. In this example the website owner does not need to make any modifications to the website, which continues to call the backend server for the stored video/image content whenever the website is accessed.

In some embodiments the decision to replace or modify the video/image content (step 603) may be indicated by a user each time new video/image content is loaded. The user may indicate with the upload how the new video/image will replace or modify the current stored video/image content.

The backend server may respond to a call from a remote media device by delivering the stored video content for a content page, accessible through the internet, from the backend server to the remote media device (step 606). The backend server may continue to monitor for new video/image content that is associated with the established executable request protocol.

The methods and systems disclosed may allow a user to use a first multimedia device connected to the internet, to upload a first video/image, and have the backend server store that first video/image as the stored video/image content. The user may use a computer application where they log in to establish their user identification or credentials. The user may be assigned an executable request protocol that is a line of code that calls the backend server to deliver the stored video/image content. The user may use the executable request protocol on the user's website, or on a portion of a website controlled, at least in part, by the user. The backend server may deliver the first video/image as the stored video/image content as a first version of the user's website. The user may use the first multimedia device or a second multimedia device to send a second video/image to the backend server. The second video/image may replace or be added to the first video/image as the stored video/image content. In this example, without making any changes to the user's website, a second version of the user's website can be displayed showing the second video/image included in the stored video/image content. Similarly, a third video/image may be uploaded to produce a third version of a user's web site.

It should be noted that the steps described in the method can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the multimedia management system 100, are taught herein.

The embodiments described herein are exemplary and numerous modifications, variations and rearrangements can be readily envisioned to achieve substantially equivalent results. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A method of providing multimedia content through an internet accessible multimedia management system including:
   a first multimedia device including communicably coupled together a memory programmed with a computer application, a processor module configured to execute said computer application, and a wireless communication module configured to communicate over a wireless communication link;
   a backend server communicably coupled to the first multimedia device via the wireless communication link, and
   a remote media device communicably coupled to the backend server;
   the method including:
      receiving by the backend server a first media file from the first multimedia device over the wireless communication link using the wireless communication module;
      storing in the backend server a stored media content including the first media file;
      responding to a call to the backend server from the remote media device by delivering the stored media content from the backend server to the remote media device;
      receiving by the backend server a second media file from the first multimedia device in response to an action taken by a user;
      replacing automatically by the backend server the stored media content to include the second media file in response to receiving the second media file by storing in the backend server the stored media content including the second media file;
      delivering the stored media content from the backend server to the remote media device without changing the call to the backend server; and
      removing automatically the first media file from the stored media content in response to receiving the second media file.

2. The method of claim 1 wherein, before automatically removing the first media file from the stored media content, the stored media content includes the first media file and the second media file.

3. The method of claim 2 wherein the stored media content is delivered in a continuous loop.

4. The method of claim 1 wherein the internet accessible multimedia management system further includes a plurality of media servers communicatively coupled to the backend server;
wherein the responding to the call to the backend server from the remote media device includes responding to a single command line from each of the plurality of media servers to deliver the stored media content to the plurality of media servers.

5. The method of claim 1 wherein the internet accessible multimedia management system includes:
a second multimedia device including communicably coupled together a second memory programmed with the computer application, a second processor module configured to execute said computer application, and a second wireless communication module configured to communicate over the wireless communication link;
the method further comprising:
receiving a third media file by the backend server from the second multimedia device;
replacing automatically by the backend server the stored media content to include the third media file by storing in the backend server the stored media content including the third media file;
delivering the stored media content from the backend server to the remote media device without changing the call to the backend server.

6. The method of claim 1, wherein the call to the backend server of the remote media device is received from a first social media platform.

7. The method of claim 1, wherein the backend server has an executable internet accessible request protocol configured to respond to the call to the backend server by delivering the stored media content and the executable internet accessible request protocol includes an application programming interface (API) configured to adapt the executable internet accessible request protocol.

8. The method of claim 7, wherein the application programming interface is further configured to integrate the stored media content on differing network platforms.

9. The method of claim 1 further comprising: setting a maximum duration, by the backend server, for the stored media content.

10. The method of claim 1, further comprising:
integrating the stored media content with a multimedia item not stored on the backend server.

11. A method of providing multimedia content through an internet accessible multimedia management system comprising:
a first multimedia device including communicably coupled together a memory programmed with a computer application, a processor module configured to execute said computer application, and a communication module configured to communicate over a communication link;
a backend server communicably coupled to the first multimedia device via the communication link, and
a remote media device communicably coupled to the backend server;
the method comprising:
receiving by the backend server a first media file from the first multimedia device over the communication link using the communication module;
storing in the backend server the first media file;
responding to a call to the backend server from the remote media device by delivering the first media file from the backend server to the remote media device;
receiving by the backend server a second media file in response to an action taken by a user;
replacing automatically by the backend server the first media file with the second media file in response to receiving the second media file without changing the call to the backend server; and
responding to the call to the backend server from the remote media device by delivering the second media file from the backend server to the remote media device.

12. The method of claim 11 wherein the internet accessible multimedia management system further includes a plurality of media servers communicatively coupled to the backend server;
wherein the responding to the call to the backend server from the remote media device includes responding to a single command line from each of the plurality of media servers to deliver the first media file or the second media file to the plurality of media servers.

13. The method of claim 11, wherein the internet accessible multimedia management system includes:
a second multimedia device including communicably coupled together a second memory programmed with the computer application, a second processor module configured to execute said computer application, and a second communication module configured to communicate over the communication link;
the method further comprising:
receiving a third media file by the backend server from the second multimedia device;
replacing automatically by the backend server the second media file with the third media file without changing the call to the backend server; and
responding to the call to the backend server from the remote media device by delivering the third media file from the backend server to the remote media device.

14. The method of claim 11, wherein the call to the backend server of the remote media device is received from a first social media platform.

15. The method of claim 11 further comprising setting a maximum file size, by the backend server, for the first media file and the second media file.

16. The method of claim 11, further comprising integrating the first media file or the second media file with a multimedia item not stored on the backend server.

17. The method of claim 11, wherein the backend server has an executable internet accessible request protocol configured to respond to the call to the backend server by delivering the first media file or the second media file.

18. The method of claim 17, wherein the executable internet accessible request protocol includes an application programming interface (API) configured to adapt the executable internet accessible request protocol.

19. The method of claim 18, wherein the application programming interface is further configured to integrate the first media file or the second media file on differing network platforms.

20. The method of claim 11, wherein the first media file and the second media file are each video files.

* * * * *